Sept. 6, 1966     T. H. SADLER ETAL     3,271,186
METHODS FOR MAKING ASBESTOS FIBER PRODUCTS
Filed Dec. 23, 1963
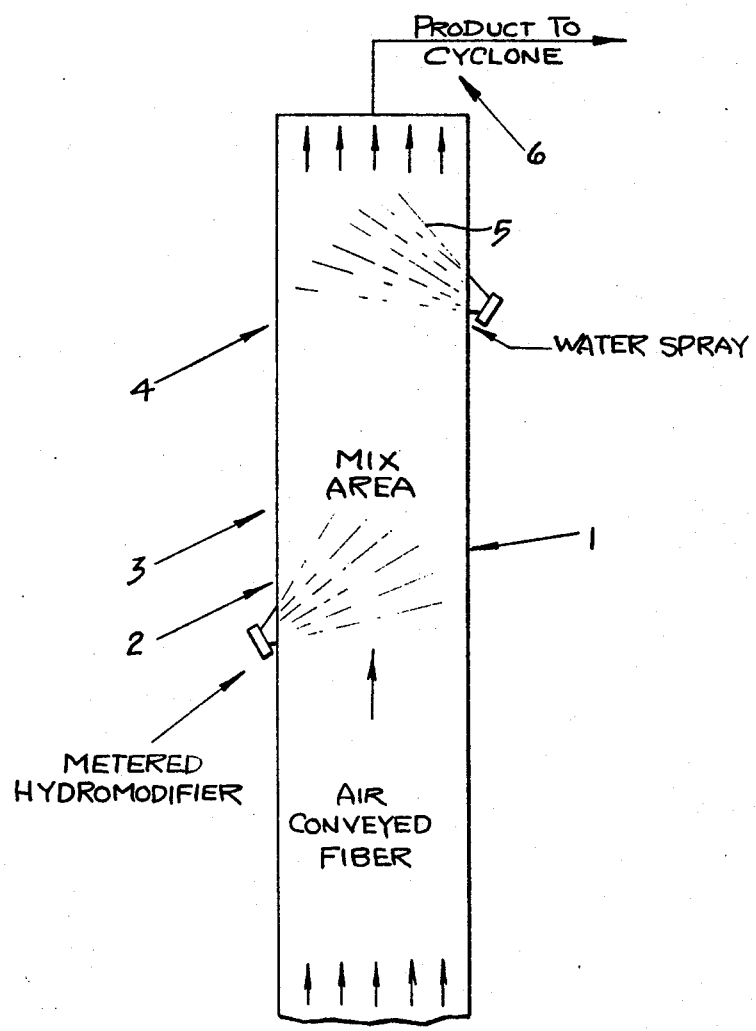
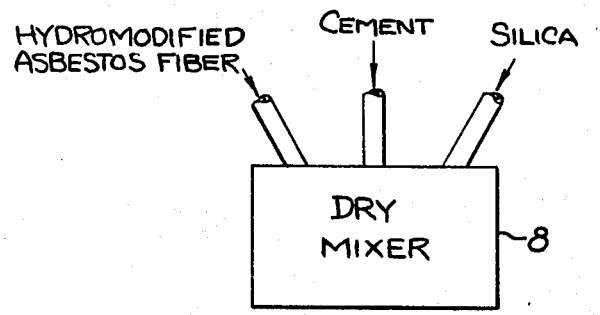
INVENTOR.
THOMAS H. SADLER
GEORGE P. REIMSCHUSSEL
BY
*John G. McKinney*
ATTORNEY 3,271,186
METHODS FOR MAKING ASBESTOS
FIBER PRODUCTS
Thomas H. Sadler, Middlesex, and George P. Reimschussel, Flemington, N.J., assignors to Johns-Manville Corporation, New York, N.Y., a corporation of New York
Filed Dec. 23, 1963, Ser. No. 332,566
8 Claims. (Cl. 117—100)

This invention relates to a mixture comprising asbestos fibers, hydromodifier and other materials wherein the hydromodifier forms a relatively minute percentage of the mixture but is distributed evenly throughout the mixture and to methods for forming such a mixture. This invention further relates to asbestos fiber products and methods for their manufacture and more particularly, to asbestos fibers coated with hydromodifier and to methods for providing these coated asbestos fibers. The term, hydromodifier, as used herein is defined in Great Britain Patent No. 922,427 dated July 23, 1963. While the invention is particularly directed to the manufacture of asbestos fibers coated with hydromodifier, it is recognized that the methods disclosed herein may be utilized to provide such coatings on other materials used in the manufacture of cementitious products such as diatomaceous earth, silica and other such products. Also it is understood that the use of such coated fibers or other materials is not limited solely to their use with cementitious products.

In Britain Patent No. 922,427, there is disclosed a system for plastic forming, including extruding and molding, asbestos-cement products from a plastic mixture having shape-retaining characteristics and comprising asbestos, hydraulic cement, water and hydromodifier. In order to obtain the full benefit of the hydromodifier, particularly in its use when in solid, particulate form, it is most important that the hydromodifier be distributed evenly throughout the plastic mixture. Other instances involving the use of some of the same or similar chemical additives, though not as hydromodifiers, such as in the oil well cementing arts, as described in U.S. Patent No. 2,779,417, also require an even distribution of the additive. The even distribution of the hydromodifier in the processes described in the said British Patent No. 922,427, has a two-fold advantage in that the desired products may be formed more easily and the quantity of the hydromodifier needed in a successful commercial system may be held to a minimum.

As a general proposition, in the combining of particles of differing natures into one mixture, the greater the amount of particles of one nature as compared to the amount of the entire mixture, the more even is the distribution of the particles of the said one nature. Thus, if one is mixing together cement, silica and asbestos fibers, where the ratio is approximately 50:25:25, then the silica and asbestos fibers should be evenly dispersed throughout the mixture. However, if another material, such as hydromodifier in solid, particulate form, is added in minute quantities so as to be in the ratio of 50:25:24:1, then probability of the hydromodifier's being distributed evenly throughout the mixture is considerably lessened.

It is an object of the instant invention to provide mixtures having an even distribution of a material throughout the mixture when that material forms but a minute percentage of the total mixture and to methods for forming such a mixture.

It is another object of the instant invention to provide a method for treating asbestos fibers so as to obtain a product wherein hydromodifier is intimately associated with the asbestos fibers and remains associated therewith when the asbestos fibers are mixed with other materials.

The foregoing objects are accomplished in accordance with the instant invention by providing a mixture comprising asbestos fibers, hydromodifier and other materials wherein the hydromodifier is adsorbed on the asbestos fibers. This coating of asbestos fibers with hydromodifier is accomplished by treating a mixture of asbestos fibers and hydromodifier with a fluid, such as water, to cause the hydromodifier to swell and become sticky so as to adhere to the asbestos fibers which come into contact therewith. In the preferred embodiment of the instant invention, asbestos fibers are conveyed through a conduit in an air suspension and hydromodifier is fed in metered amounts, such as through conventional spray equipment, into this air suspension of asbestos fibers and joins therewith for continued movement of the air suspension in the conduit. The introduction of hydromodifier into the air suspension of asbestos fibers is accompanied by sufficient turbulence so as to cause a rapid and complete mixing of the hydromodifier and the asbestos fibers. The mixed hydromodifier and asbestos fibers, while still in the air suspension and within the conduit, are passed through a fluid spray, which in the preferred embodiment comprises atomized droplets of water, wherein water is absorbed by the hydromodifier, causing the hydromodifier to swell and become sticky so as to adhere to the asbestos fibers when the swelled hydromodifier and the asbestos fibers come into contact with each other due to the turbulence in the air suspension. In this manner, the hydromodifier is adsorbed on the fibers and in effect forms a coating on the asbestos fibers. The asbestos fibers coated with the hydromodifier are then passed through a conventional cyclone to remove air and water vapor therefrom and the asbestos fibers with the hydromodifier adsorbed thereon are then packaged for any desired use. Although the term hydromodifier is used to identify substances in the instant invention, it is to be understood that the invention is not limited to the particular use of hydromodifier as described in the said British Patent, No. 922,427. The instant invention is intended to supply an asbestos fiber product for use in any desired field such as the oil well cementing arts, tile grouting wall formation and other fields wherein asbestos fibers may be utilized in combination with a substance which may be identified or exemplified as a hydromodifier material.

The invention will be more fully understood and further objects and advantages thereof will become apparent when reference is made to the following detailed description of a preferred embodiment of the invention as illustrated generally in the schematic illustrations in the accompanying drawing.

FIG. 1 is an illustration of the preferred system for accomplishing the inventive concepts of the instant application; and FIG. 2 is an illustration of a system for forming the mixtures of the instant application.

In carrying out the procedures of the instant invention, the crude asbestos ore is processed by conventional means to produce asbestos fibers which may be classified into various grades. After the separation of the asbestos fibers into the various grades, those grades selected to be processed further in accordance with the preferred embodiment of the instant invention are passed through the apparatus illustrated generally in FIG. 1 of the drawing.

The selected asbestos fibers are introduced into a conventional apparatus (not shown) which incorporates metered amounts of the asbestos fibers into an air suspension moving in a predetermined direction. The air suspension of asbestos fibers is then introduced into the conduit 1 for movement therethrough in a direction indicated by the arrows. The conduit 1 is supported so that the air suspension moves generally in a vertical direction. The desired type of hydromodifier in solid, particulate form is introduced into conventional apparatus (not shown) such as a Tornado blower, so that metered amounts of the hydromodifier may be added to the air suspension of asbestos fibers in the conduit 1. In one embodiment of the invention, the hydromodifier is delivered through spray nozzles at a location indicated generally at 2 into the air suspension of asbestos fibers in the conduit 1. The spray nozzles 2, through which the hydromodifier is introduced, are designed to provide the hydromodifier in a jet of air moving in a direction generally transverse to the direction of movement of said air suspension of asbestos fiber so as to create a high degree of turbulence in the air suspension of the asbestos fibers so as to form a mixing area 3 wherein the asbestos fibers and the hydromodifier are thoroughly mixed so as to disperse the hydromodifier uniformly throughout the mixture. If desired, an alternate method of introducing the hydromodifier could comprise the gravity feed of metered amounts of hydromodifier through a baffle in the wall of the conduit 1. If necessary, a fluid jet, such as an air jet, could be provided to create turbulence in the mixing area. The air suspension of mixed asbestos fibers and hydromodifier then continues through the conduit to the portion 4 wherein a plurality of spray nozzles 5 are positioned to add fluid, which in the preferred embodiment comprises atomized droplets of water moving in a direction generally transverse to the direction of movement of the air suspension of asbestos fiber and hydromodifier. The atomized droplets of water are distributed throughout the air suspension of asbestos fiber and hydromodifier and contact the particles of hydromodifier and are absorbed thereby so as to swell the particles of hydromodifier and when swelled the particles of hydromodifier become sticky so that when the swelled particles of hydromodifier contact the asbestos fibers, because of the turbulence in the air suspension, they stick to the asbestos fibers. Each of the swelled particles of hydromodifier spreads out over the surface of the asbestos fiber with which it is associated and is adsorbed thereon to form a coating. This swelling and spreading out of the hydromodifier functions to provide a method for increasing the effective surface area of the hydromodifier material so that the hydromodifier material may be more readily available for use when incorporated in a mixture with other materials. The mixing of the asbestos fibers, hydromodifier and atomized water droplets is continued within the conduit 1 a sufficient length of time so that substantially all of the hydromodifier becomes attached to and coats the asbestos fibers. The asbestos fibers coated with the hydromodifier are then fed, as indicated generally at 6, to a conventional cyclone where the air and water vapor are removed therefrom and the asbestos fibers coated with the hydromodifier are collected.

In the foregoing paragraphs of the instant application, it is stated that the asbestos fibers are coated with the hydromodifier. It is to be understood that this does not mean that the entire surface area of each asbestos fiber is or must be covered by a continuous coating of hydromodifier. However, this terminology is used so as to signify that after the particle of hydromodifier absorbs the water, swells and becomes attached to an asbestos fiber its association with the asbestos fiber is such that it forms a coating that covers that portion of the surface area of the asbestos fiber to which it is attached. In effect, the hydromodifier is adsorbed onto the asbestos fibers.

As heretofore indicated, it is desirous to have the hydromodifier distributed uniformly throughout the ultimate mixture being used in a process so as to obtain the full benefit thereof. As explained above, one method of obtaining an even distribution of the hydromodifier throughout the ultimate mixture is to have the hydromodifier associated with the asbestos fibers. One way of determining the degree of this association is to measure the adhesive tendency of the hydromodifier in sticking to the asbestos fibers. For example, if an air suspension of asbestos fibers and hydromodifier is sprayed with atomized droplets of water in accordance with the procedures described above, and after the resulting product has been dried, a serious attempt is made to dislodge the hydromodifier from the asbestos fibers, and it can be shown that a substantial portion of hydromodifier remains adhered to the fiber, it can be assumed that when the treated asbestos fibers are mixed together with the other ingredients of the ultimate mixture the hydromodifier will be evenly dispersed throughout the ultimate mixture. In a hydromodifier and asbestos fiber mixture wherein no water is applied to the mixture, there is little or no tendency for the hydromodifier to stick to the asbestos fiber. Thus, if the mixture is passed through a series of screens, such as used in the Ro–Tap system for dry separation of asbestos fiber into sized fractions, and an ignition loss test is run on all the fractions to determine the amount of hydromodifier in each fraction, it is found that virtually all of the hydromodifier has been collected in the lowest undersized screen fraction. However, as water is added to the mixture, such as by atomized droplets as set forth above, it is found that, as the percentage of water is increased, larger quantities of the hydromodifier are found in the higher screen fractions, thus indicating better adherence of the hydromodifier to the asbestos fibers.

The following table records the results of a series of tests performed on mixtures of asbestos fibers and hydromodifier which were passed through a conduit and sprayed with atomized droplets of water generally in accordance with the procedures described previously in the specification. In conducting the tests to obtain the data for this table, the ratio of the asbestos fibers and hydromodifier in the mixture remained constant while the percentage of the weight of the atomized droplets of water was varied from about 0 to 20 percent. The asbestos fiber used in preparing the mixture was a chrysotile asbestos fiber and was a staple article of commerce marketed by Johns-Manville Corporation under the trade designation 6D20. The hydromodifier used in the mixture was a staple article of commerce marketed by the Dow Chemical Company under the trade designation Methocel 65HG4000 centipoise, being a hydroxy propoxyl methyl cellulose. Sufficient hydromodifier was added to the mixture so that the hydromodifier comprised about 4% by weight of the mixture. After passing through the system, the treated mixtures were divided into two parts. One part remained as treated and the other part was passed twice through a conventional impact mill. The purpose of this was to measure the degree of retention of the hydromodifier on the asbestos fibers after being subjected to harsh handling. The apparatus used in this part of the run comprised an Entoleter impact mill of the type marketed by the Entoleter Division of The Safety Car Heating and Lighting Company under the trade designation Type PPM, Catalogue No. R-1404-302. Each part was then passed through conventional Ro-Tap screens such as described in the Manual of Testing Procedures for Chrysotile Fiber, copyright 1962 by the Asbestos Textile Institute, Quebec Asbestos Mining Association and the Asbestos Cement Products Association, pages 35–40, inclusive, and separated into various fractions. These fractions were obtained from samples of each part of the treated fibers which were sieved through standard 20-mesh and 80-mesh screens using ten (10) gram fiber samples and Ro-Tapping for one (1) hour. An ignition loss test was then run on each fraction to determine the percentage of hydromodifier in that fraction. The ignition loss test comprises the taking of samples from each fraction. After the samples were dried at 175° C. for 3 hours, they were ignited at 1000° C. Blanks, consisting of samples of untreated feed fiber, were also dried and ignited in the same manner. The difference in the 175° C. to 1000° C. weight losses between the blank and the treated fiber indicated the amount of hydromodifier present. The results of these tests are shown in the following table:

| Percent Water | Percent Ignition Loss Values | | | | | |
| --- | --- | --- | --- | --- | --- | --- |
| | As Treated Mixture | | | 2 Passes (Impact Mill) | | |
| | +20 | −20+80 | −80 | +20 | −20+80 | −80 |
| 0 | 1.2 | 2.0 | 6.6 | | | |
| 5 | 1.6 | 3.0 | 6.0 | 2.3 | 2.8 | 7.4 |
| 10 | 2.4 | 3.6 | 4.6 | 2.4 | 3.3 | 6.7 |
| 15 | 4.4 | 5.2 | 2.7 | 3.0 | 4.4 | 4.0 |
| 20 | 4.4 | 5.2 | 2.3 | 4.2 | 6.5 | 3.0 |

The results from this series of tests indicate that for the particular type of fiber and the particular type of hydromodifier used there is a change in the results obtained when atomized droplets of water in an amount of about 10% by weight of the mixture are added to the air suspension of hydromodifier and asbestos fibers in the conduit. However, as indicated in the table, significantly better results are obtained when atomized droplets of water in the amount of about 15% by weight of the mixture are added to the air suspension of hydromodifier and asbestos fibers. When the atomized droplets of water comprise about 20% by weight of the mixture, the system begins to be loaded with water causing difficulties in collecting the treated fibers and removing the excess water therefrom. Also, this amount of water leads to excessive compacting and adhesion of the asbestos fibers to each other resulting in difficulty in the opening of the fibers for their intended use. Therefore, the addition of atomized droplets of water, in mixtures as set forth in the foregoing examples, in excess of 20% by weight of the mixture is not recommended for a commercial operation. Also, in accordance with the foregoing remarks, the operable range for the atomized droplets of water is between about 8 and 25% by weight of the mixture and the recommended range is between 12 and 20% by weight of the mixture.

It is understood that the foregoing examples are given for illustration purposes only and that the invention is not to be limited thereto. Also, it is to be noted that the examples are directed to a particular grade and type of asbestos fiber having mixed therewith a particular percentage of a particular type of hydromodifier. Since the invention encompasses all types of asbestos fibers, including chrysotile, crocidolite, amosite, tremolite and anthophyllite and many different types of hydromodifier, the relative percentage of water used may vary with the types and grades of asbestos fibers and hydromodifier and also with the relative percentage of the hydromodifier added to the asbestos fibers. Thus, in those instances wherein the hydromodifier comprises about 12% by weight of the mixture of asbestos fiber and hydromodifier, additional amounts of water may be used. In treating asbestos fibers for use in accordance with the disclosure in British Patent No. 922,427, the hydromodifier should be present in the amount of at least about 2.0 percent of the weight of the mixture of asbestos fibers and hydromodifier. In the final extrusion dry mix, the hydromodifier would then constitute about 0.5% by weight of the total dry mix. However, the variables associated with other types of fibers and other perecntages and other types of hydromodifier may be readily determined and all are included within the scope of the instant invention. In the preferred embodiments, the hydromodifier would be present in amounts less than 3% by weight of the total dry mix.

In FIG. 2, there is illustrated a system for forming a mixture comprising asbestos fibers, hydromodifier and other materials, such as cement and silica. In the desired mixtures the hydromodifier comprises only a minute percentage of the total mixture and yet it is desired to have the hydromodifier distributed evenly throughout the mixture. As pointed out above, this is accomplished by first associating the hydromodifier with the asbestos fibers, which form a relatively large percentage of the total mixture, and then mixing the asbestos fibers with the other materials of the mixture. In the preferred embodiment of the invention, the hydromodifier is associated with the asbestos fibers by being adsorbed thereon, as set forth above. In the system illustrated in FIG. 2, asbestos fibers having hydromodifier adsorbed thereon, cement and silica are fed into a dry mixer 8. The materials are then mixed so as to distribute the asbestos fibers having the hydromodifier adsorbed thereon evenly throughout the mixture. In this manner the hydromodifier is distributed evenly throughout the mixture.

In one embodiment of the invention, a mixture comprising 600 grams of asbestos fibers having hydromodifier adsorbed thereon, 900 grams of ground silica, of the type marketed under the trade designation "New Jersey Silex," and 1500 grams of Portland cement, of the type marketed under the trade designation "New Jersey Silex," and 1500 grams of Portland cement, of the type marketed under the trade designation "Pioneer National" Type I Portland Cement, were placed in a conventional dry mixer of the type marketed under the trade designation, "Readco Type P–15" mixer. The asbestos fibers having hydromodifier adsorbed thereon comprised 600 grams of chrysotile asbestos, 6D20 as described above, treated with 4% by weight of hydromodifier, Methocel 65HG4000 centipoise as described above, in accordance with the system described above wherein atomized droplets of water in the amount of about 15% by weight of the mixture was added to the air suspension of asbestos fibers and hydromodifier. Thus, the hydromodifier in this mixture comprised about 0.8% by weight of the total mixture of 3000 grams. The dry mixer was run for five minutes to provide a mixture wherein the hydromodifier was distributed evenly throughout the mixture.

Since the foregoing mixture may be used as a basis for an extrusion test, after the materials had been dry mixed, they were transferred to a conventional wet mixer of the type marketed under the trade designation, "Baker-Perkins" sigma blade mixer. Water in the amount of 725.5 grams was added to the mixture and the resulting mixture was wet mixed for a total of fifteen minutes. The wet mixed material was preformed into a cylinder having an outside diameter of approximately 3¼ inches. The preformed cylinder was placed in a hydraulic powered, ram-type extruder having approximately a 3¼ inch bore and a 13½ inch stroke. The die and the die-retaining ring were attached to the extruder. The extrusion die opening is three inches wide by 0.24 inch high, the corners of the opening being filleted with a ⅟₁₆ inch radius. The minimum land length is 6 inches and the rear of the die is combed at an angle of 60° to provide smooth transition from the round extruder bore to the rectangular die opening. The entire interior of the die is hard chromium plated. Hydraulic power was then applied to the ram and the material within the extruder issued from the die opening onto a strip of paper supported on a takeoff table. The paper was pulled away from the die by the extrusion operator at a speed coinciding with the speed with the column of material extruded from the die. The material in the above described mixture is extruded successfully from the die as a smooth, homogeneous product having no splitting, cracking, curling or crumbling.

While the invention has been described in rather full detail, it will be understood that these details need not be strictly adhered to and that various changes and modifications may suggest themselves to one skilled in the art, all falling within the scope of the invention as defined by the subjoined claims.

What we claim is:
1. Method for manufacturing an asbestos fiber product comprising:
    (a) mixing together asbestos fiber and hydromodifier and moving said mixture in a predetermined direction,
    (b) adding to the moving mass of asbestos fibers and hydromodifier atomized droplets of water to swell said hydromodifier and to coat at least portions of said asbestos fibers with said water swollen hydromodifier, and
    (c) drying and collecting said coated asbestos fibers.
2. Method for manufacturing an asbestos fiber product comprising:
    (a) forming an air suspension of asbestos fibers and hydromodifier moving in a predetermined direction,
    (b) adding to the moving air suspension of asbestos fibers and hydromodifier atomized droplets of water to swell said hydromodifier and to coat at least portions of said asbestos fibers with said water swollen hydromodifier, and
    (c) drying and collecting said coated asbestos fibers.
3. Method for manufacturing an asbestos fiber product comprising:
    (a) forming an air suspension of asbestos fibers moving in a predetermined direction,
    (b) adding to said air suspension of asbestos fibers solid, particulate hydromodifier to form an air suspension of asbestos fibers and hydromodifier moving in a predetermined direction,
    (c) adding to the moving air suspension of asbestos fibers and hydromodifier atomized droplets of water to swell said hydromodifier and to coat at least portions of said asbestos fibers with said water swollen hydromodifier, and
    (d) drying and collecting said coated asbestos fibers.
4. Method for manufacturing an asbestos fiber product comprising:
    (a) forming an air suspension of asbestos fibers moving in a predetermined direction,
    (b) adding to said air suspension of asbestos fibers particulate, finely divided hydromodifier to form an air suspension of asbestos fibers and hydromodifier moving in a predetermined direction,
    (c) creating turbulence in said air suspension of asbestos fibers and hydromodifier by the addition of said hydromodifier to cause a rapid and complete mixing of said hydromodifier and said asbestos fibers,
    (d) adding to the moving air suspension of asbestos fibers and hydromodifier atomized droplets of water to swell said hydromodifier and to coat at least portions of said asbestos fibers with said water swollen hydromodifier, and
    (e) drying and collecting said coated asbestos fibers.
5. Method for manufacturing an asbestos fiber product comprising:
    (a) forming an air suspension of asbestos fibers moving in a predetermined direction,
    (b) adding to said air suspension of asbestos fibers finely divided hydromodifier, comprising a hydroxy propoxyl methyl cellulose, to form an air suspension of asbestos fibers and hydromodifier moving in a predetermined direction,
    (c) adding to the moving air suspension of asbestos fibers an hydromodifier atomized droplets of water in an amount between about 8 to 25% by weight of the mixture of said asbestos fibers and hydromodifier to swell said hydromodifier, and to coat at least portions of said asbestos fibers with said water swollen hydromodifier, and
    (d) drying and collecting said coated asbestos fibers.
6. Method for manufacturing an asbestos fiber product comprising:
    (a) forming an air suspension of asbestos fibers moving in a predetermined direction,
    (b) adding to said air suspension of asbestos fibers a hydromodifier, comprising a hydroxy propoxyl methyl cellulose, to form an air suspension of asbestos fibers and hydromodifier moving in a predetermined direction,
    (c) adding to the moving air suspension of asbestos fibers and hydromodifier atomized droplets of water in the amount of approximately at least 12% by weight of the asbestos fibers and hydromodifier to swell said hydromodifier and to coat at least portions of said asbestos fibers with said water swollen hydromodifier, and
    (d) drying and collecting said coated asbestos fibers.
7. Method for manufacturing an asbestos fiber product comprising:
    (a) forming an air suspension of asbestos fibers moving in a predetermined direction,
    (b) adding hydromodifier, comprising a hydroxy propoxyl methyl cellulose, to said air suspension of asbestos fibers to form an air suspension of asbestos fibers and hydromodifier moving in a predetermined direction,
    (c) adding to the moving air suspension of asbestos fibers and hydromodifier atomized droplets of water in amount between about 12 to 20% by weight of the asbestos fiber and hydromodifier to swell said hydromodifier and to coat at least portions of said asbestos fibers with said water swollen hydromodifier, and
    (d) drying and collecting said coated asbestos fibers.
8. Method for manufacturing an asbestos fiber product comprising:
    (a) forming an air suspension of asbestos fibers moving in a predetermined direction,
    (b) adding to said air suspension of asbestos fibers a hydromodifier, comprising a hydroxy propoxyl methyl cellulose, to form an air suspension of asbestos fibers and hydromodifier moving in a predetermined direction,
    (c) adding to the moving air suspension of asbestos fibers an hydromodifier atomized droplets of water in the amount of approximately 15% by weight of the asbestos fibers and hydromodifier to swell said hydromodifier and to coat at least portions of said asbestos fibers with said water swollen hydromodifier, and
    (d) drying and collecting said coated asbestos fibers.

References Cited by the Examiner
UNITED STATES PATENTS

| | | | |
|---|---|---|---|
| 2,568,023 | 9/1951 | Perry | 106—99 |
| 2,604,416 | 7/1952 | Dolbey | 117—100 |
| 2,778,283 | 1/1957 | Bettoli et al. | 162—155 |
| 3,150,034 | 9/1964 | Vukasovich et al. | 162—155 |

FOREIGN PATENTS

| | | |
|---|---|---|
| 559,951 | 7/1958 | Canada. |
| 887,997 | 1/1962 | Great Britain. |
| 922,427 | 4/1963 | Great Britain. |

TOBIAS E. LEVOW, *Primary Examiner.*

S. E. MOTT, *Assistant Examiner.*